(12) United States Patent
Peng et al.

(10) Patent No.: US 10,216,526 B2
(45) Date of Patent: Feb. 26, 2019

(54) CONTROLLING METHOD FOR OPTIMIZING A PROCESSOR AND CONTROLLING SYSTEM

(71) Applicant: MediaTek Inc., Hsin-Chu (TW)

(72) Inventors: Mark Shane Peng, ZhuBei (TW); Lee-Kee Yong, Hsinchu (TW); Yi-Chang Zhuang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/921,035

(22) Filed: Oct. 23, 2015

(65) Prior Publication Data

US 2016/0203006 A1    Jul. 14, 2016

Related U.S. Application Data

(60) Provisional application No. 62/103,179, filed on Jan. 14, 2015.

(51) Int. Cl.
| | |
|---|---|
| *G06F 1/32* | (2006.01) |
| *G06F 1/26* | (2006.01) |
| *G06F 9/445* | (2018.01) |
| *G06F 1/3206* | (2019.01) |
| *G06F 1/324* | (2019.01) |
| *G06F 1/3234* | (2019.01) |
| *G06F 1/3287* | (2019.01) |
| *G06F 1/3296* | (2019.01) |

(52) U.S. Cl.
CPC ............ *G06F 9/44505* (2013.01); *G06F 1/26* (2013.01); *G06F 1/324* (2013.01); *G06F 1/3206* (2013.01); *G06F 1/3275* (2013.01); *G06F 1/3287* (2013.01); *G06F 1/3296* (2013.01); *Y02D 10/126* (2018.01); *Y02D 10/14* (2018.01); *Y02D 10/171* (2018.01); *Y02D 10/172* (2018.01)

(58) Field of Classification Search
CPC .................................... G06F 1/26; G06F 1/32
See application file for complete search history.

(56) References Cited

U.S. PATENT DOCUMENTS

| | | | | |
|---|---|---|---|---|
| 6,754,837 B1* | 6/2004 | Helms | ................... | G06F 1/3203 327/114 |
| 7,256,788 B1* | 8/2007 | Luu | ....................... | G06F 1/3203 345/211 |
| 7,647,513 B2* | 1/2010 | Tobias | .................. | G06F 1/3203 713/300 |
| 8,074,093 B1* | 12/2011 | Johnson | ................ | G06F 1/3296 713/300 |
| 2005/0273636 A1* | 12/2005 | Grobman | .............. | G06F 1/3203 713/322 |

(Continued)

FOREIGN PATENT DOCUMENTS

| | | |
|---|---|---|
| CN | 1737772 A | 2/2006 |
| CN | 101067797 A | 11/2007 |
| CN | 103838668 A | 6/2014 |

*Primary Examiner* — Phil K Nguyen
(74) *Attorney, Agent, or Firm* — McClure, Qualey & Rodack, LLP (57) ABSTRACT

A controlling method for optimizing a processor is provided. The controlling method includes determining an actual utilization state of the processor in a first period, and adjusting performance and/or power of the processor in a second period by a PID (Proportional Integral Derivative) governor based on the actual utilization state in the first period. The second period is after the first period.

17 Claims, 10 Drawing Sheets (56) References Cited

U.S. PATENT DOCUMENTS

| | | | |
|---|---|---|---|
| 2006/0031691 A1* | 2/2006 | Bacchus | G06F 1/3228 |
| | | | 713/300 |
| 2012/0110352 A1* | 5/2012 | Branover | G06F 1/206 |
| | | | 713/300 |
| 2013/0328890 A1* | 12/2013 | Avkarogullari | G06F 1/3234 |
| | | | 345/501 |
| 2014/0089603 A1* | 3/2014 | Krishnapura | G06F 12/0831 |
| | | | 711/146 |
| 2014/0149752 A1* | 5/2014 | Brock | G06F 1/3206 |
| | | | 713/300 |
| 2016/0034013 A1* | 2/2016 | Kim | G06F 1/324 |
| | | | 713/320 |

* cited by examiner

CONTROLLING METHOD FOR OPTIMIZING A PROCESSOR AND CONTROLLING SYSTEM

CROSS REFERENCE TO RELATED APPLICATIONS

This application claims the benefit of U.S. Provisional Application No. 62/103,179, filed on Jan. 14. 2015, the entirety of which is incorporated by reference herein.

BACKGROUND OF THE INVENTION

Field of the Invention

The present inventive concept relates to a controlling method and a controlling system for optimizing a processor. More particularly, the inventive concept relates to a controlling method and a controlling system for optimizing a processor by utilizing the PID (Proportional Integral Derivative) governor.

Description of the Related Art

Processors are widely utilized in many electronic devices to execute various kinds of threads. Different threads require different working requests or loading for the processor. If a thread requires many working request, or there are too many threads running at the same time, high performance will be needed for the processor to handle this situation which results in consuming more power. If a thread requires few working request, or there are few threads running at the same time, low performance will be sufficient for the processor to handle this situation without consuming too much power.

However it is difficult to predict or determine the request requiring the thread, because the request dynamically changes as the current thread is running or another thread is initiated. In addition, there are many factors affecting the performance and power of the processor. Analyzing such factors will be complicated and consumes time. Therefore, an easily-implemented controlling method and controlling system are needed for dynamically optimizing the processor without analyzing many factors.

BRIEF SUMMARY OF THE INVENTION

The present invention provides a controlling method for optimizing a processor. The controlling method includes determining an actual utilization state of the processor in a first period, and adjusting performance and/or power of the processor in a second period by a PID (Proportional Integral Derivative) governor based on the actual utilization state in the first period. The second period is after the first period.

The present invention provides a controlling system for optimizing a processor. The controlling system includes a monitor and a PID governor. The monitor is utilized for determining an actual utilization state of the processor in a first period. The PID governor is utilized for adjusting performance and/or power of the processor in a second period based on the actual utilization state in the first period. The second period is after the first period.

In a first aspect of the present invention, the controlling system further determines a target utilization value of the processor before the PID governor adjusts performance and/or power of the processor. The PID governor extracts an actual utilization value from the determined actual utilization state to evaluate the overall utilization of the processor after the monitor determines the actual utilization state. Furthermore, the PID governor compares the actual utilization value with the target utilization value to obtain an error value for adjusting performance and/or power of the processor after the PID governor extracts the actual utilization value and determines the target utilization value. In addition, the PID governor compares the actual utilization state with the target utilization value to obtain an error value for adjusting performance and/or power of the processor after the PID governor determines the actual utilization state and the target utilization value.

In another aspect of the present invention, the PID governor determines a proportional parameter, an integral parameter and a derivative parameter by the PID governor to obtain a dynamic adjustment value based on the actual utilization state before the PID governor adjusts performance and/or power of the processor. The proportional parameter is determined from recent error values of the first period, the integral parameter is determined from error values in a long time of the first period, and the derivative parameter is determined from error values in a short time of the first period. In another aspect of the present invention, the integral parameter corresponds to a low frequency, and the derivative parameter corresponds to a high frequency. Furthermore, the proportional parameter, the integral parameter and the derivative parameter have different weightings for obtaining the dynamic adjustment value, and the weightings of the proportional parameter, the integral parameter and the derivative parameter are determined according to the characteristics of the processor.

In another aspect of the present invention, the PID governor adjusts performance and/or power of the processor by adjusting an operating frequency and/or an operating voltage of the processor for being operated in the second period. In addition, when the processor is a multi-core processor, the PID governor adjusts performance and/or power of the processor by determining the number of cores to be initiated for operating the processor in the second period. In still another aspect of the present invention, the PID governor adjusts performance and/or power of the processor by determining at least one portion of a memory for operating the processor in the second period.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following description is of the best-contemplated operation of carrying out the invention. This description is made for the purpose of illustrating the general principles of the invention and should not be taken in a limiting sense. Certain terms and figures are used throughout the description and following claims to refer to particular components. As one skilled in the art will appreciate, manufacturers may refer to a component by different names. This document does not intend to distinguish between components that differ in name but not function. The terms "component", "system" and "device" used in the present invention could be the entity relating to the computer which is hardware, software, or a combination of hardware and software. Accordingly, if one device is coupled to another device, that connection may be through a direct electrical connection, or through an indirect electrical connection via other connections.

Figure 1:
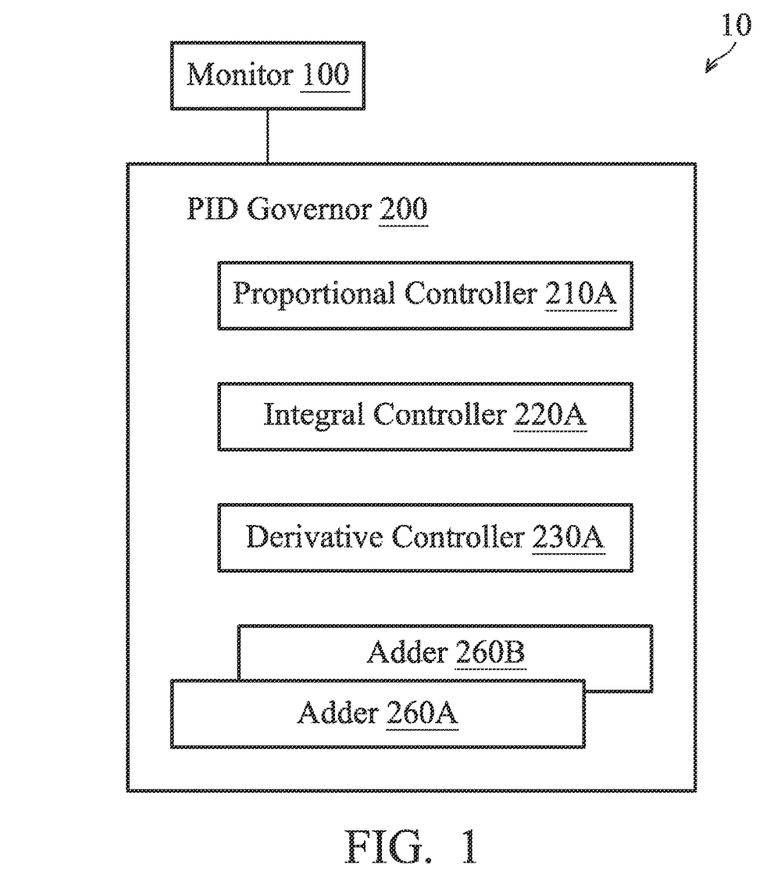
FIG. 1 is a schematic diagram of a controlling system according to the present invention.

FIG. 1 is a schematic diagram of a controlling system 10 according to the present invention. The controlling system 10 could be a partial architecture of a processor for an electronic device. The processor could be Central Processing Units (CPUs) or Graphics Processing Units (GPUs). For example, the processor further includes a digital signal processor (DSP), a microcontroller (MCU) or a plurality of parallel processors relating the parallel processing environment to implement the operating system (OS), firmware, driver and/or other applications of the controlling system 10. The electronic device could be a mobile electronic device such as a cell phone, a tablet computer, a laptop computer or a PDA, or could it be an electronic device such as a desktop computer or a server. In another embodiments, the controlling system 10 could be implemented into a power management integrated circuit (PMIC) as to manage power supply for a process or an electronic device.

As shown in FIG. 1, the controlling system 10 includes a monitor 100 and a PID (Proportional Integral Derivative) governor 200. The PID governor 200 includes at least one proportional controller 210A, at least one integral controller 220A, at least one derivative controller 230A, and at least two adders 260A and 260B. In one embodiment, the monitor 100 is utilized to determine an actual utilization state of the processor in a first period and extract an actual utilization value from the determined actual utilization state to evaluate the overall utilization of the processor. The PID governor 220 is utilized to determine a target utilization value of the processor, compare the actual utilization value with the target utilization value to obtain an error value for adjusting performance and/or power of the processor, determine a proportional parameter, an integral parameter and a derivative parameter to obtain a dynamic adjustment value, and adjust the performance and/or power of the processor in a second period according to the dynamic adjustment value. It should be noted that only the past actual utilization state of the processor is monitored without gathering and analyzing many factors related to the processor. Afterwards, the three PID parameters could be determined and the current performance and power of the processor could be adjusted according to the monitored actual utilization state. As such, the controlling system 10 of the present invention provides an efficient and easily-implemented method for optimizing the processor based on its past utilization state.

Figure 2:
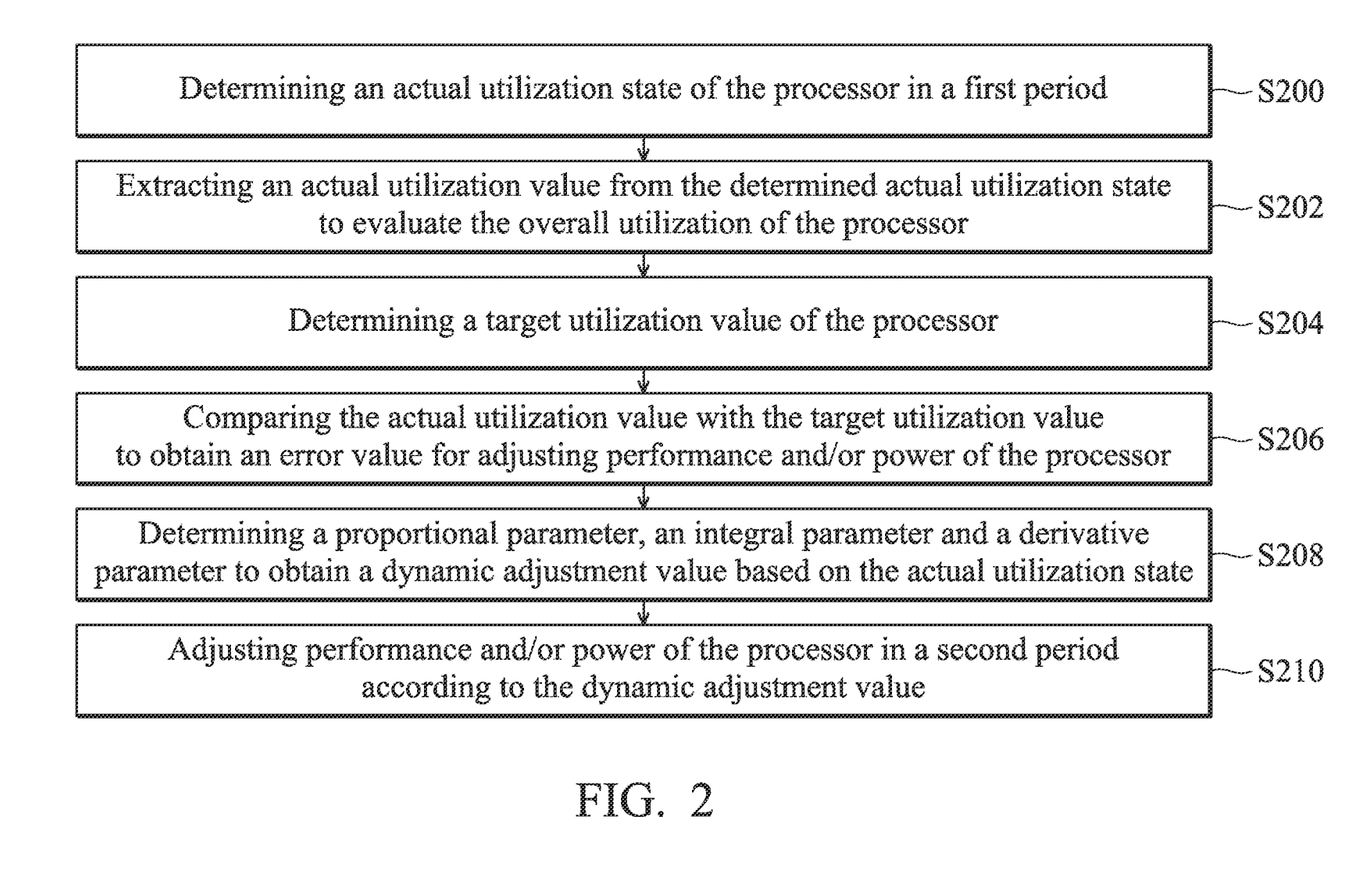
FIG. 2 is a flow chart illustrating the controlling method according to the present invention.

FIG. 2 is a flow chart illustrating the controlling method according to the present invention. The controlling method is implemented with the controlling system 10 as shown in FIG. 1. In step S200, an actual utilization state of the processor in a first period is determined. In step S202, an actual utilization value is extracted from the determined actual utilization state to evaluate the overall utilization of the processor. In step S204, a target utilization value of the processor is determined. It should be noted that in some embodiments, step S204 could be executed before step S200 or S202. For example, the target utilization value is a predetermined value or could be determined by users. Afterwards, in step S206, the actual utilization value is compared with the target utilization value to obtain an error value for adjusting performance and/or power of the processor. In step S208, a proportional parameter, an integral parameter and a derivative parameter are determined to obtain a dynamic adjustment value based on the actual utilization state. More specifically, the dynamic adjustment value could be a DVFS (dynamic voltage/frequency scaling) point. Afterwards, the performance and/or power of the processor are adjusted in a second period according to the dynamic adjustment value in step S210. For example, the voltage or frequency of the processor is adjusted according to the DVFS point.

Figure 3:
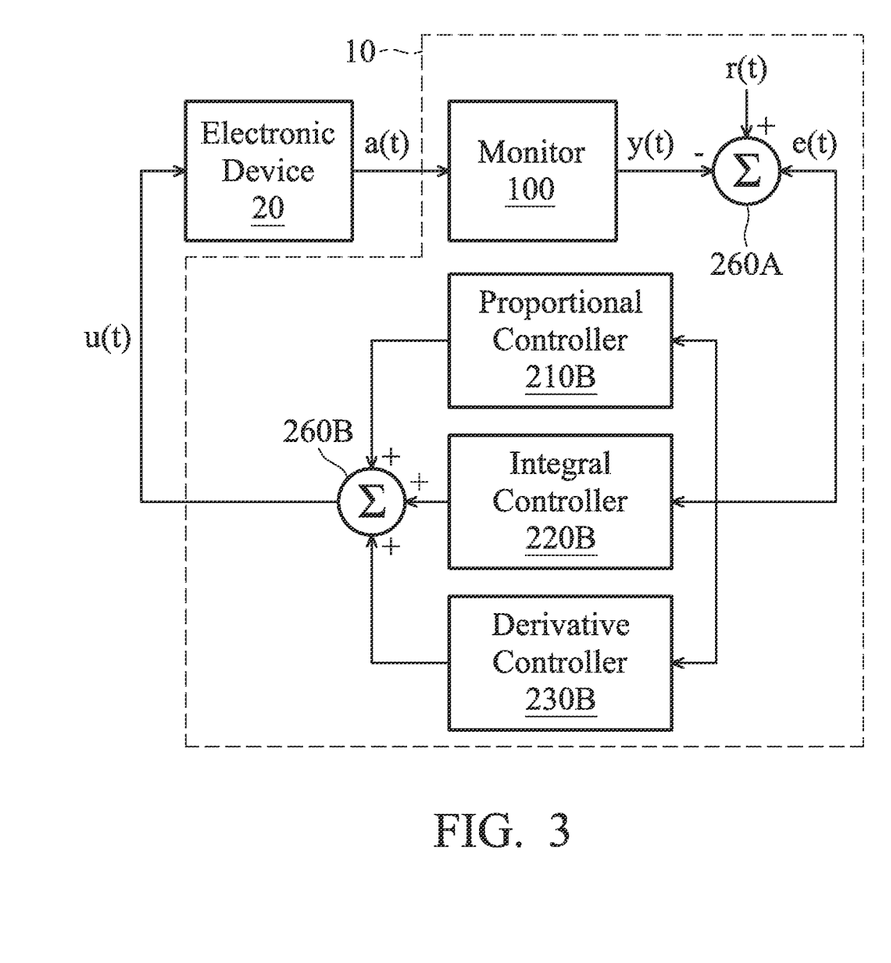
FIG. 3 is schematic diagram of an electronic device and a controlling system according to the present invention.

FIG. 3 is schematic diagram of an electronic device 20 and a controlling system 10 according to the present invention. The controlling system 10 includes the monitor 100, the adder 260A, the proportional controller 210A, the integral controller 220A, the derivative controller 230A, and the adder 260B. The adder 260A is coupled between the monitor 100 and the three controllers 210A~230A, and the three controllers 210A~230: are coupled between the adders 260A and 260B. It should be noted that the arrangement shown in the schematic diagram of FIG. 3 is for illustration rather than limitation. For example, in some embodiments, the controlling system 10 is embedded in the processor of the electronic device 20. In addition the electronic device 20 of FIG. 3 represents the operating process of software and hardware of the electronic device 20. As shown in FIG. 3, a feedback control loop is formed by the controlling system 10 and the electronic device 20.

In one embodiment, the monitor 100 determines an actual utilization state a(t) of the electronic device 20 in a first period. More specifically, the monitor 100 detects the processor of the electronic device 20 and determines an actual utilization state a(t) of the processor of the electronic device 20 in the first period. For example, the processor is utilized for executing various kinds of threads such as detecting a touching operation or executing a software application. The actual utilization state a(t) is utilized to indicate the degree about how the processor is utilized to executes the threads. Afterwards, the monitor 100 extracts at least one actual utilization value y(t) from the determined actual utilization state a(t) to evaluate the overall utilization of the processor after the monitor 100 determines the actual utilization state a(t).

Furthermore, the controlling system 10 determines a target utilization value r(t) of the processor before it adjusts performance and/or power of the processor. The target utilization value r(t) could also be determined by users or determined corresponding to the design of the electronic device 20. More specifically, the target utilization value r(t) is a percentage value. If the target utilization value r(t) is a high value such as 95%, it means the processor is performance-oriented and meets the requirements of the threads. If the target utilization value r(t) is about 50%, it means that the processor or not totally occupied and some buffer exist for the processor to handle some urgent situations. As shown in FIG. 3, the adder 260A compares the actual utilization value y(t) with the target utilization value r(t) to obtain an error value e(t) for adjusting performance and/or power of the processor. The error value e(t) could also be provided by subtracting the actual utilization value y(t) from the target utilization value r(t). It should be noted that, in some embodiments, the governor 200 does not extract the actual utilization value y(t), and the adder 260A compares the actual utilization state a(t) with the target utilization value r(t) to obtain an error value e(t).

In addition, the proportional controller 210A, the integral controller 220A and the derivative controller 230A determine a proportional parameter, an integral parameter and a derivative parameter respectively to obtain a dynamic adjustment value u(t) based on the actual utilization state. The proportional parameter is determined by the proportional controller 210A, the integral parameter is determined by the integral controller 220A, and the derivative parameter is determined by the derivative controller 230A. More specifically, the proportional parameter is determined from recent error values e(t) of the first period, the integral parameter is determined from error values e(t) in a long time of the first period, and the derivative parameter is determined from error values e(t) in a short time of the first period. In one embodiment, the integral parameter corresponds to a low frequency, and the derivative parameter corresponds to a high frequency. In other words, the integral parameter primarily relates to the low operating frequency of the processor, for example, the 3 sec to 5 sec. The derivative parameter primarily relates to the high operating frequency of the processor, for example, 10 ms to 50 MS.

Regarding the proportional parameter, it could be represented by $k_p \cdot e(t)$. In other words, the proportional parameter is proportional to the current error value e(t), and it can be adjusted by multiplying the error value e(t) by a constant $K_p$ which is called the proportional gain constant. The proportional parameter is utilized to evaluate the current status of the processor which is utilized for the electronic device 20. The proportional parameter plays an important role when there is a huge gap between the actual utilization state a(t) and the target utilization value r(t) or when there is a huge gap between the actual utilization value y(t) and the target utilization value r(t).

Regarding the integral parameter, it could be represented by $K_i \int_0^t e(\tau)d\tau$. The integral parameter is proportional to both the magnitude of the error value e(t) and the duration of the error. In one embodiment, the integral parameter is the sum of the instantaneous error values e(t) over a long operating period of time for the processor and cancels the accumulated offset. Because the integral parameter is derived by integrating a plurality of error value e(t) over a long period of time, it primarily relates to the low operating frequency of the processor. Afterwards, the accumulated error value e(t) is multiplied by the integral gain $K_i$ to obtain the integral parameter and attain the equilibrium point.

Regarding the derivative parameter, it could be represented by $$K_d \cdot \frac{de(t)}{dt}.$$

More specifically, the derivative parameter of the present invention is calculated by determining the slope between two error values e(t) over a short period of operating time of the processor, and multiplying this slope value by the derivative gain $K_d$. Because the derivative parameter is derived by determining the slope of error value e(t) over a short period of time, it primarily relates to high operating frequency of the processor. It should be noted that the derivative parameter is emphasized more when high performance is required by the processor.

In another embodiment, the proportional parameter, the integral parameter and the derivative parameter have different weightings for obtaining the dynamic adjustment value u(t). The weightings of the proportional parameter, the integral parameter and the derivative parameter are determined according to the characteristics of the processor. Some threads or applications may require using only one or two of the proportional parameter, the integral parameter and the derivative parameter to provide the controlling method. This is achieved by setting the other parameters to lower weighting or zero. For example, if high performance is required by the processor, the derivative parameter could have higher weighting than the other two PID parameters. If low power is required by the processor, the integral parameter could have higher weighting than the other two PID parameters.

As shown in FIG. 3, the dynamic adjustment value is generated by the adder 260B which gathers the proportional parameter, the integral parameter and the derivative parameter. The dynamic adjustment value u(t) is derived based on the actual utilization state in the first period. It should be noted that the dynamic adjustment value u(t) could be a DVFS point which includes the frequency information and voltage information for adjustment. In other words, the controlling system 10 adjusts performance and/or power of the processor by adjusting an operating frequency and/or an operating voltage of the processor for being operated in the second period after the first period. For example, when the actual utilization state a(t) is greater than target utilization value r(t), the error value e(t) will reflect the difference between the actual utilization state a(t) and the target utilization value r(t) and contribute to the dynamic adjustment value u(t). Afterwards, the actual utilization state a(t) could be decreased by increasing the operating frequency of the processor which is indicated by the dynamic adjustment value u(t).

In one embodiment, when the processor is a multi-core processor, the controlling system 10 adjusts performance and/or power of the processor by determining the number of cores to be initiated for operating the processor in the second period. For example, if high performance is required for operating the processor, a plurality of cores will need to be initiated for providing high performance. If low performance is required for operating the processor, few cores or one single core will be sufficient to provide low performance. In another embodiment, the controlling system 10 adjusts performance and/or power of the processor by determining at least one portion of a memory for operating the processor in the second period. If high performance is required for operating the processor, a large portion of memory will need to be initiated for providing high performance. If low performance is required for operating the processor, a small portion of memory will be sufficient to provide low performance.

Figure 4:
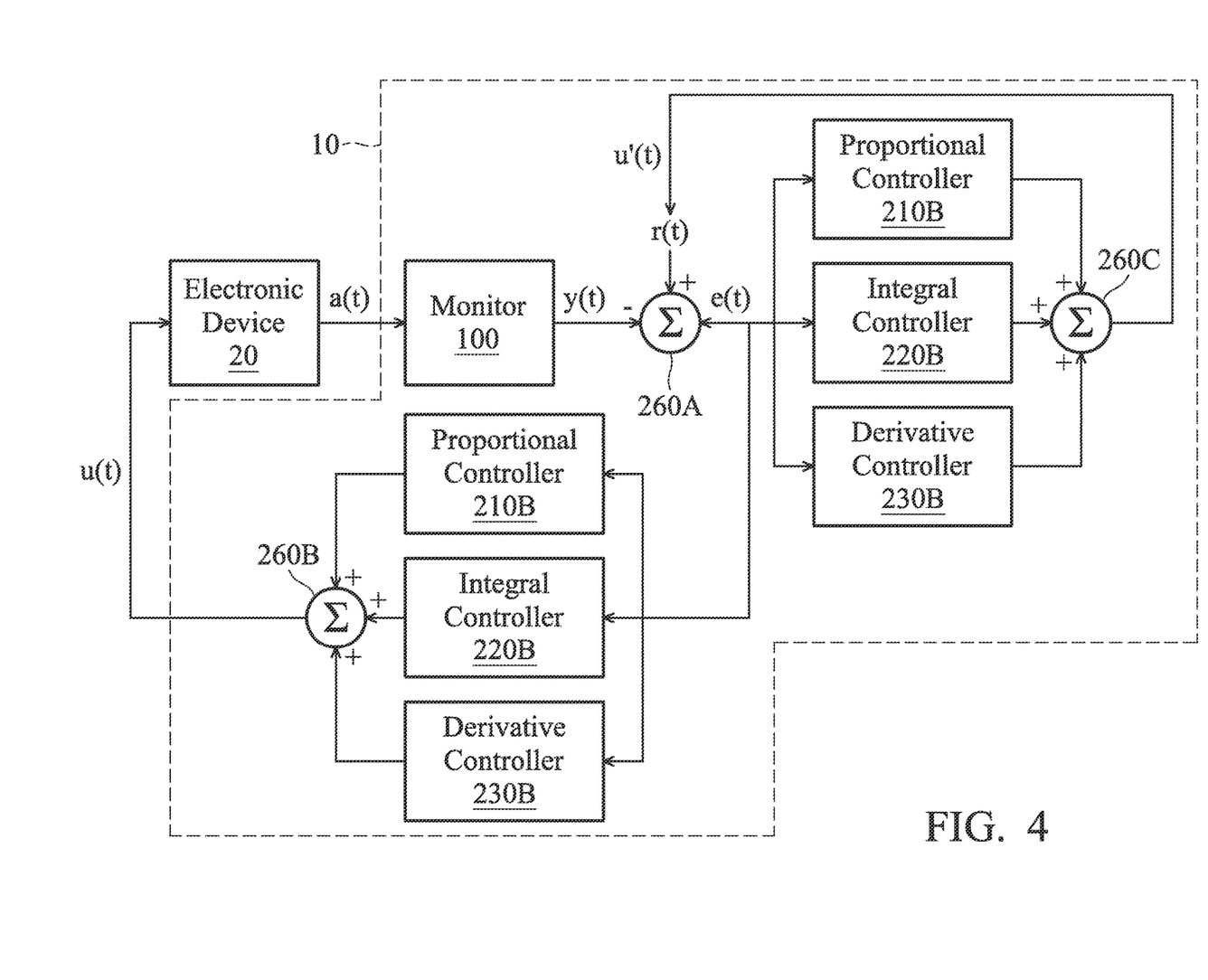
FIG. 4 is another schematic diagram of an electronic device and a controlling system according to the present invention.

FIG. 4 is another schematic diagram of an electronic device 20 and a controlling system 10 according to the present invention. Compared with the embodiment of FIG. 3, the controlling system 10 of FIG. 4 further includes the adder 260C, and also includes the proportional controller 210B, the integral controller 220B and the derivative controller 230B arranged between the adders 260A and 260C. Accordingly, the controlling system of FIG. 3 is a single-loop architecture, and the controlling system of FIG. 4 is a multi-loop architecture. The proportional controller 210B, the integral controller 220B and the derivative controller 230B determine a proportional parameter, an integral parameter and a derivative parameter respectively. The adder 260C gathers the proportional parameter the integral parameter and the derivative parameter to obtain another dynamic adjustment value u'(t) based on the actual utilization state a(t) or the actual utilization value y(t). Specifically, the proportional parameter is determined from recent error values e(t) of the first period, the integral parameter is determined from error values e(t) in a long time of the first period, and the derivative parameter is determined from error values e(t) in a short time of the first period. It should be noted that the dynamic adjustment value u'(t) is utilized to adjust the target utilization value r(t). Therefore, the target utilization value r(t) can be dynamically adjusted according to the actual utilization state a(t) of the electronic device 20 to optimize the processor and the electronic device more accurately and efficiently.

Figure 5A:
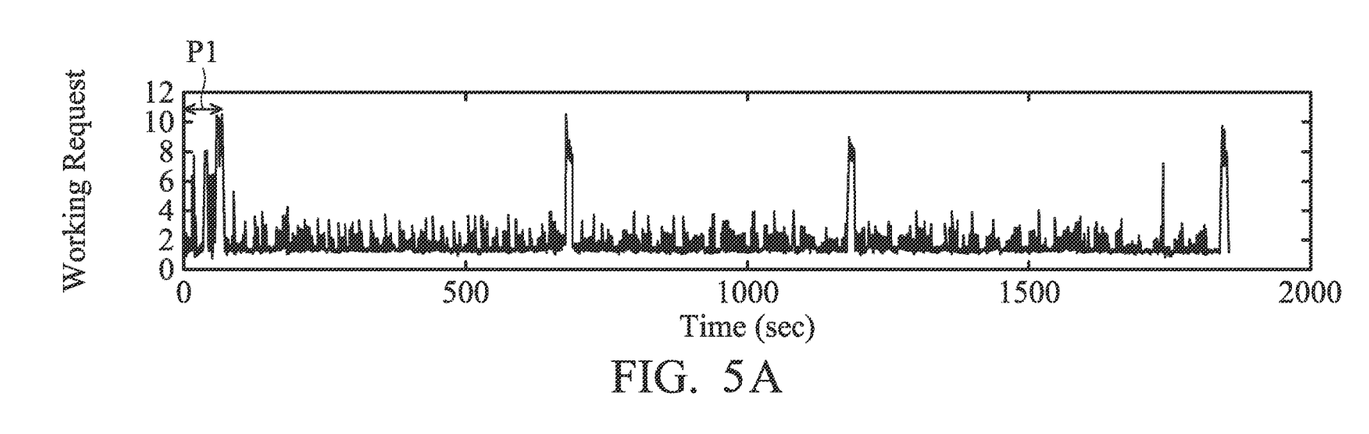
FIG. 5A is schematic diagram illustrating the working request for a processor.
Figure 5B:
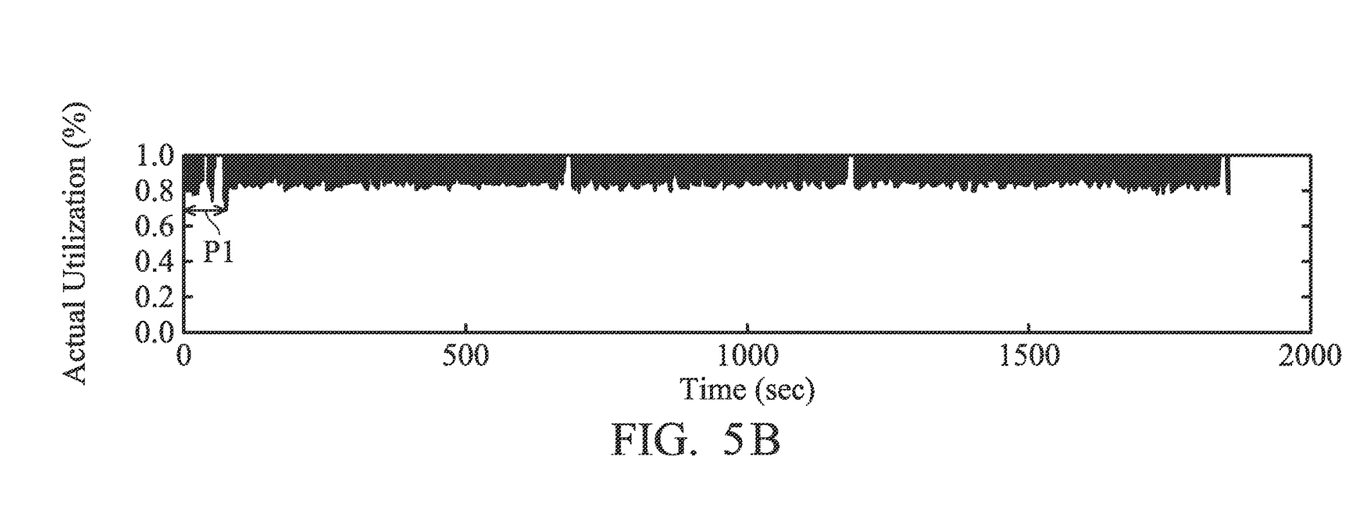
FIG. 5B and FIG. 5C are schematic diagrams illustrating the actual utilization and the dynamic adjustment value with the controlling method of the present invention.
Figure 5C:
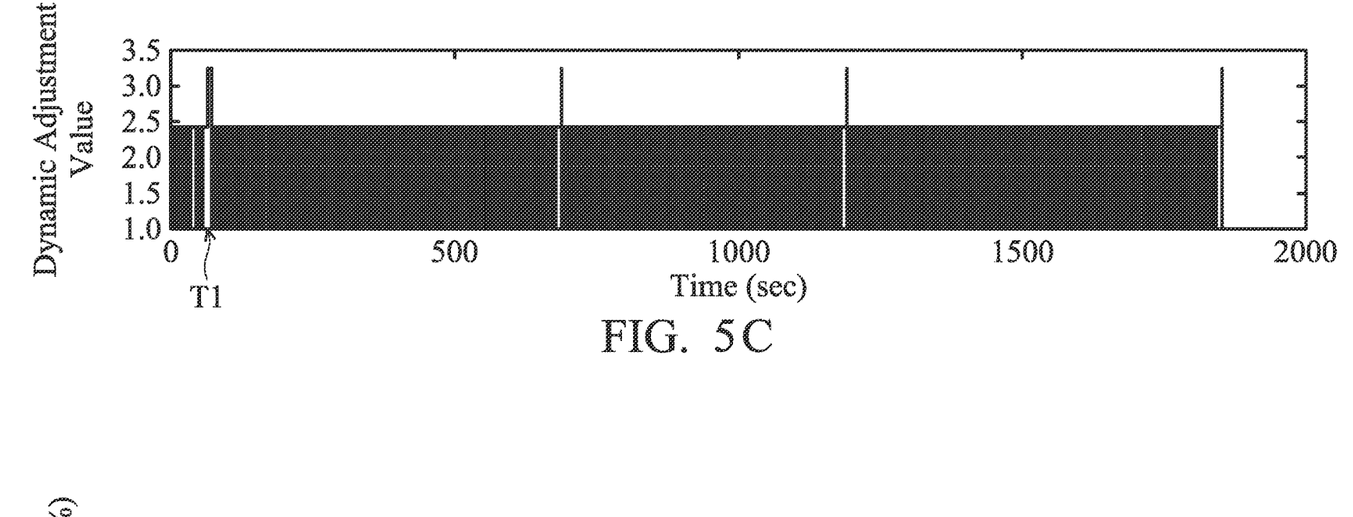

FIG. 5A is schematic diagram illustrating the working request or a processor. FIG. 5B and FIG. 5C are schematic diagrams illustrating the actual utilization state a(t) and the dynamic adjustment value u(t) with the controlling method of the present invention. As shown in FIG. 5A, the working request increases rapidly in the period of P1. Regarding the actual utilization state a(t) of FIG. 5B, mostly the actual utilization state a(t) is above 80% and the target utilization value r(t) is about 95%. The actual utilization state a(t) of FIG. 5B also fluctuates and increases rapidly in the period P1 corresponding to the rapid increase of working request of FIG. 5A. Therefore, the dynamic adjustment value u(t) is generated according to the actual utilization state a(t). More specifically, the dynamic adjustment value u(t) of FIG. 5C represents the operating frequency of the processor. At the time T1 which is after the P1 period, the dynamic adjustment value u(t) increases from 2.5 to about 3.2. Because the operating frequency increases at time T1, the actual utilization state a(t) decreases and remains about 80%. In some embodiments, the target utilization value r(t) could also be dynamically adjusted by the controlling system with the PID governor of the present invention.

Figure 5D:
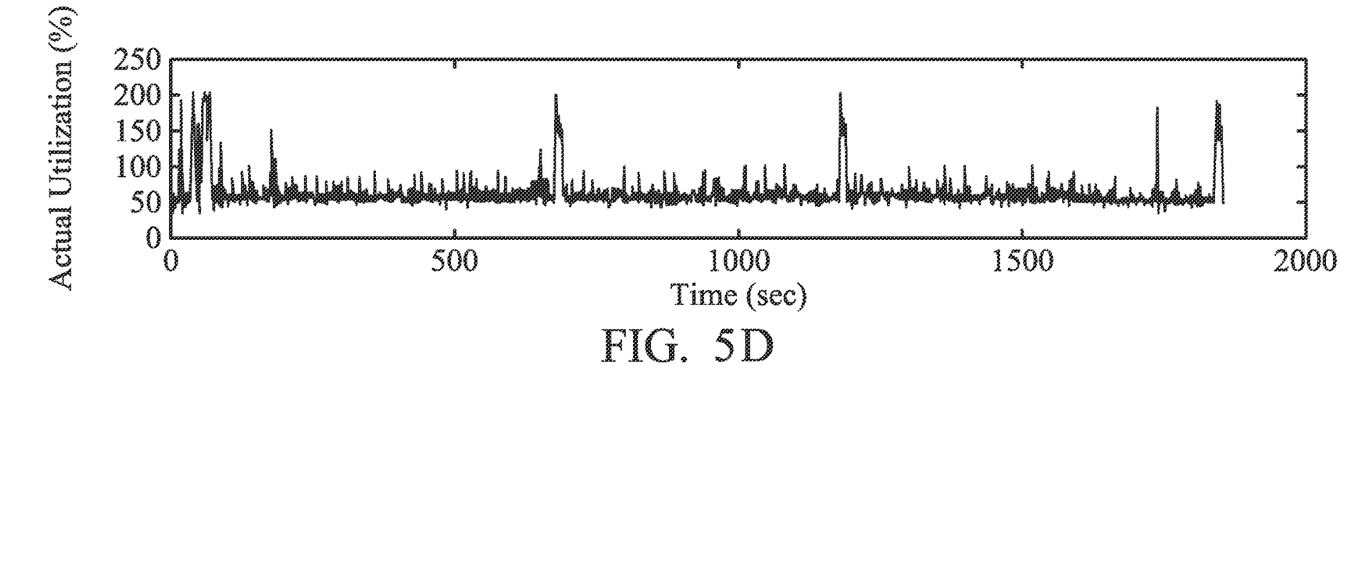
FIG. 5D and FIG. 5E are schematic diagrams illustrating the actual utilization and the dynamic adjustment value without the controlling method of the present invention.
Figure 5E:
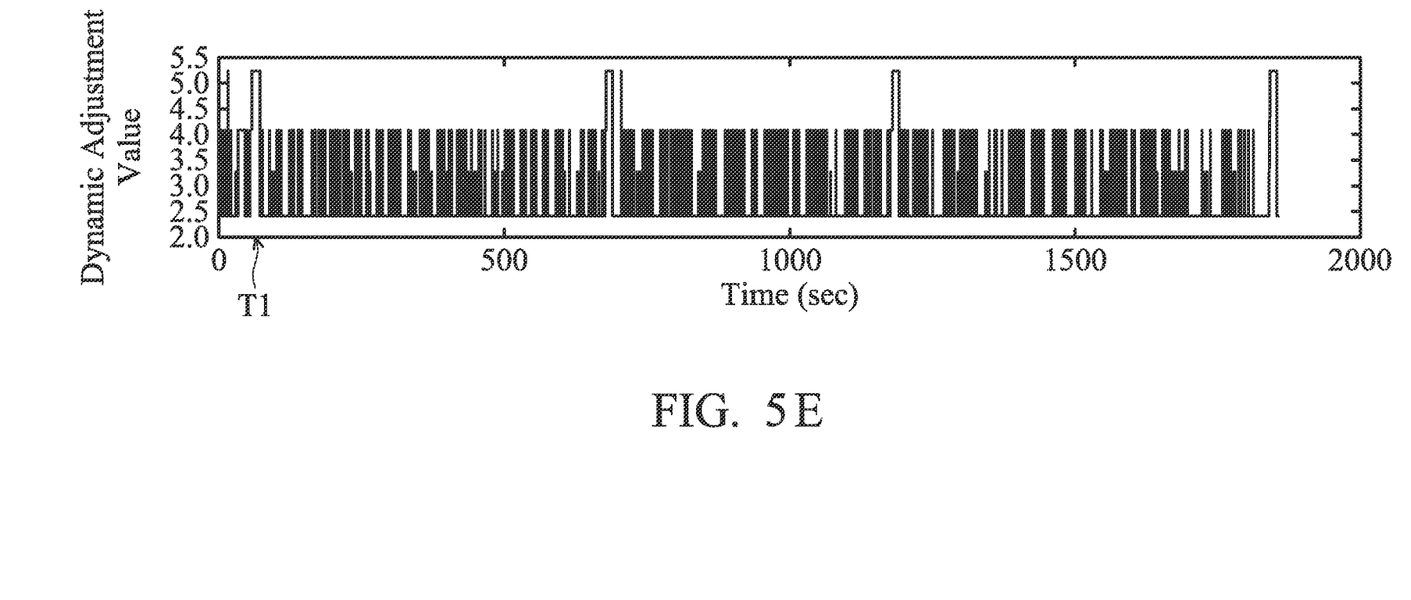

FIG. 5D and FIG. 5E are schematic diagrams illustrating the actual utilization and the dynamic adjustment value without the controlling method of the present invention. Regarding the actual utilization state of FIG. 5D, mostly the actual utilization state is above 50% and the target utilization value is about 60%. The actual utilization state a(t) of FIG. 5D also fluctuates and increases rapidly in the period P1 corresponding to the rapid increase of working request of FIG. 5A. Therefore, the dynamic adjustment value is generated according to the actual utilization state. More specifically, the dynamic adjustment of FIG. 5E represents the operating frequency of the processor. At the time T1 which is after the P1 period, the dynamic adjustment value increases from 4.0 to about 5.2. Because the operating frequency increases at time T1, the actual utilization state a(t) decreases and remains about 50%. It should be noted that since the power consumed is proportional to the operating frequency, the power consumed with the controlling method of the present invention as shown in FIG. 5B and FIG. 5C are lower than the power consumed without the controlling method of the present invention as shown in FIG. 5D and FIG. 5E. Furthermore, by utilizing the power consumed with the controlling method of the present invention, the performance per power could be increased by 27%.

Figure 6A:
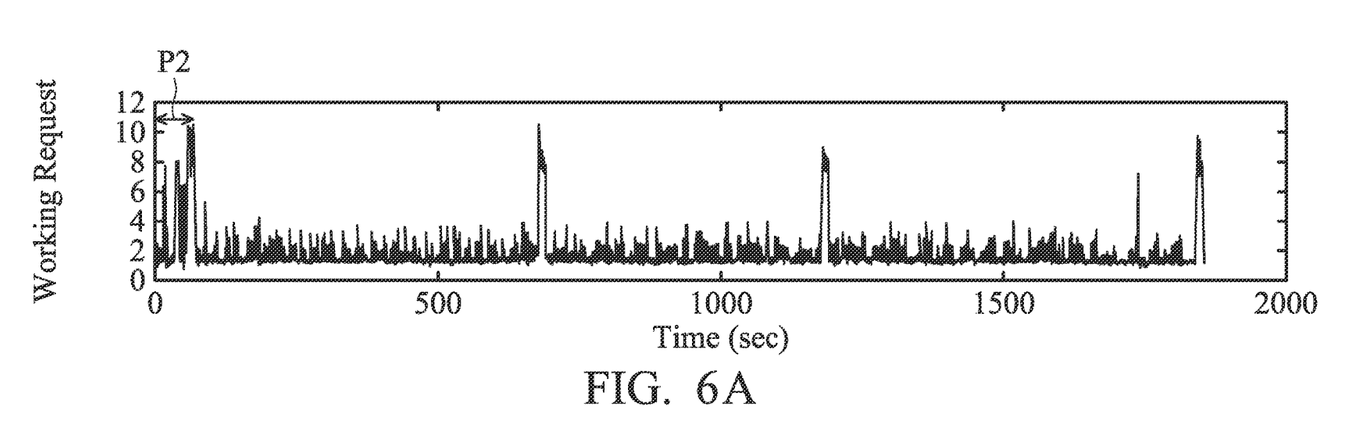
FIG. 6A is schematic diagram illustrating the working request for a processor.
Figure 6B:
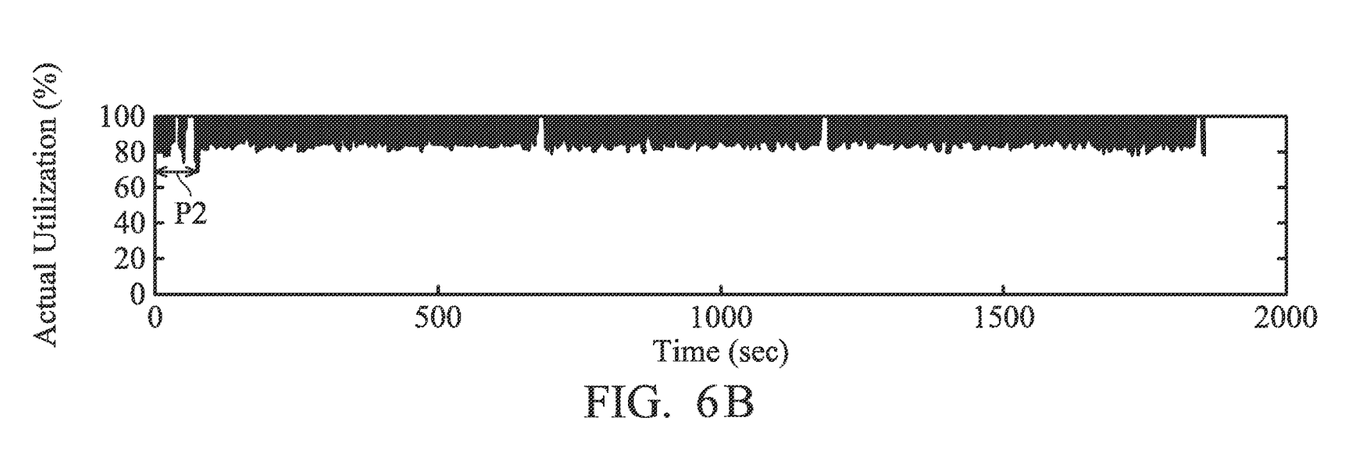
FIG. 6B and FIG. 6C are schematic diagrams illustrating the actual utilization and the dynamic adjustment value with the controlling method of the present invention and FIG. 6D, FIG. 6E and FIG. 6F are schematic diagrams illustrating the proportional parameter, the integral parameter and the derivative parameter with the controlling method of the present invention.
Figure 6C:
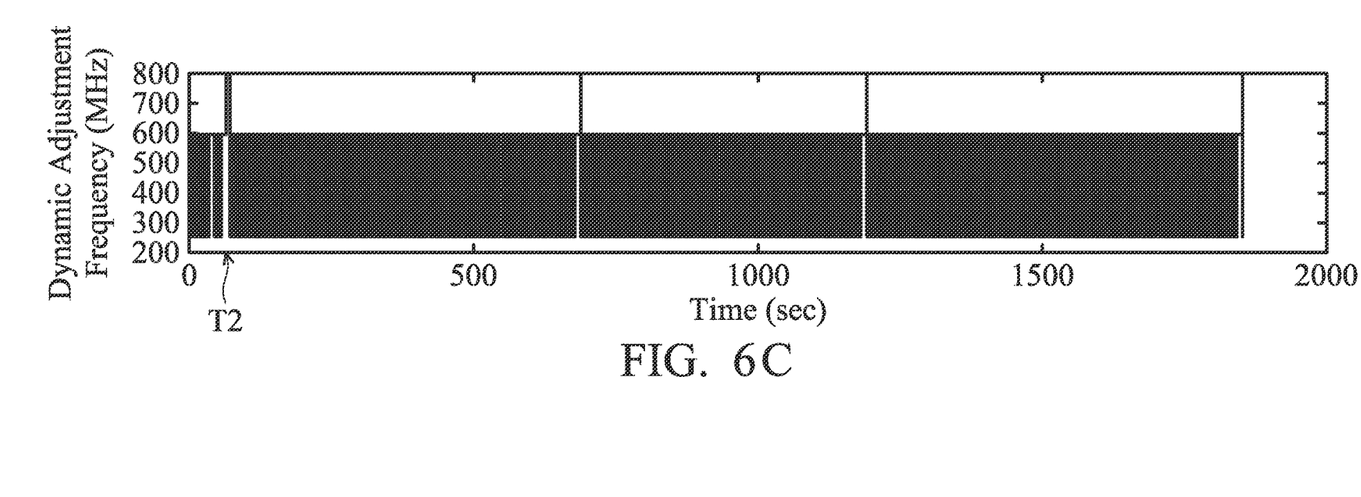

FIG. 6A is schematic diagram illustrating the working request for a processor. FIG. 6B and FIG. 6C are schematic diagrams illustrating the actual utilization and the dynamic adjusting frequency with the controlling method of the present invention. As shown in FIG. 6A, the working request increases rapidly in the period of P2. Regarding the actual utilization state a(t) of FIG. 6B, mostly the actual utilization state a(t) is above 80% and the target utilization value r(t) is about 95%. The actual utilization state a(t) of FTG. 6B also fluctuates and increases rapidly in the period P2 corresponding to the rapid increase of working request of FIG. 6A. At the time T2 which is after the P2 period, the dynamic adjusting frequency increases from 600 MHz to about 800 Mz. Because the operating frequency increases at time T2, the actual utilization state a(t) decreases and remains about 80%.

Figure 6D:
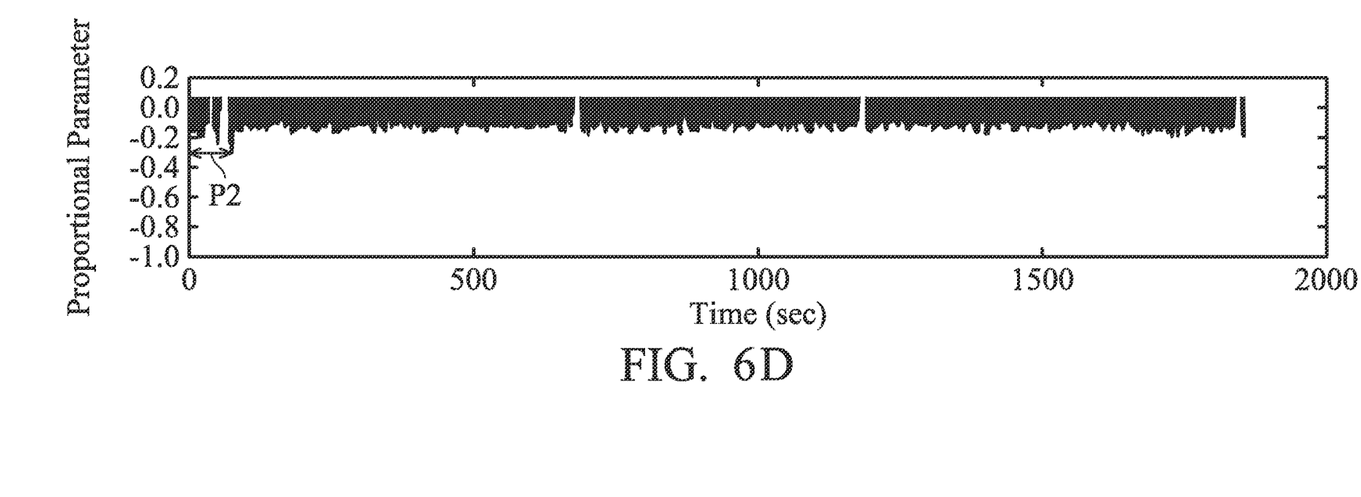
Figure 6E:
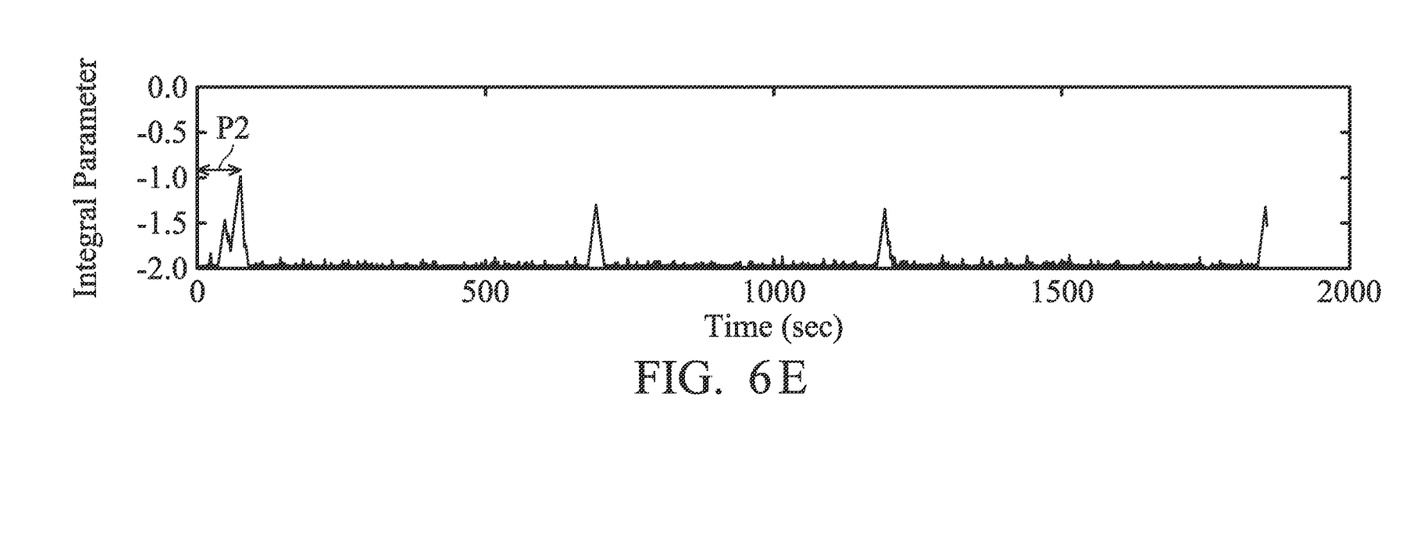
Figure 6F:
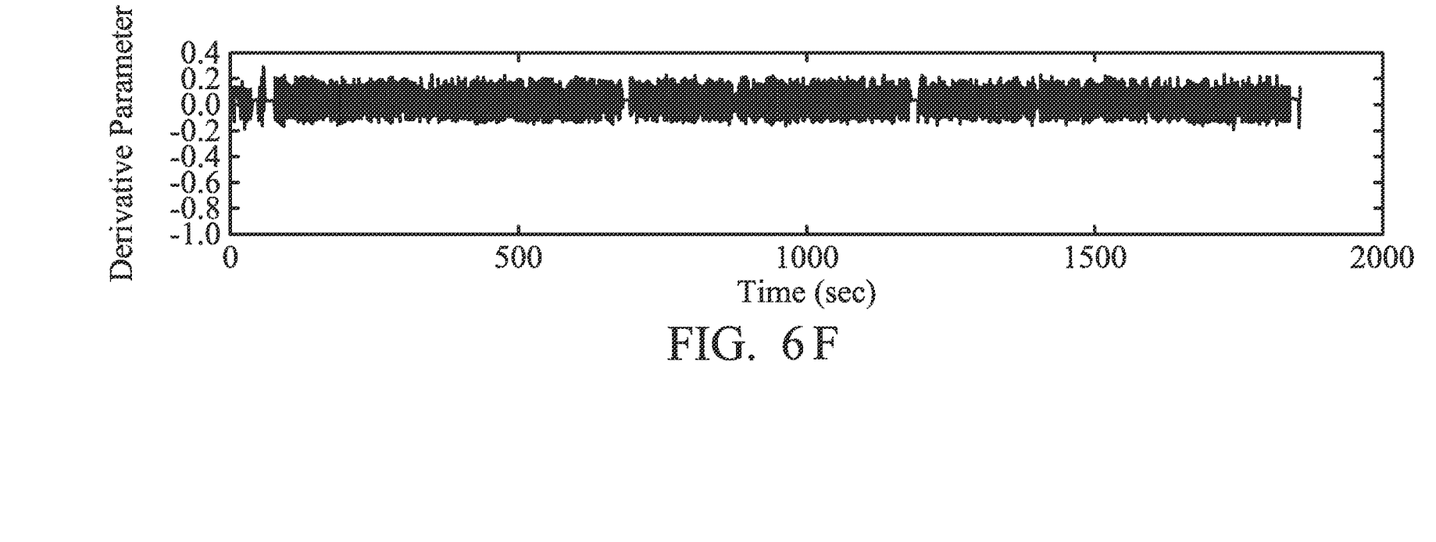

FIG. 6D, FIG. 6E and FIG. 6F are schematic diagrams illustrating the proportional parameter, the integral parameter and the derivative parameter with the controlling method of the present invention. The proportional parameter and the integral parameter fluctuate and increase in the period P2 corresponding to the fluctuation of the actual utilization state of FIG. 6B, and remain almost constantly after the period P2. The derivative parameter of FIG. 6F does not change rapidly since the difference between the actual utilization state a(t) and the target utilization value r(t) are small. Only the past actual utilization state of the processor is monitored and detected, and the three PID parameters could be determined and the current performance and power of the processor could be adjusted according to the monitored actual utilization state. Therefore, the controlling method and controlling system of the present invention are easily-implemented and could be utilized for dynamically and rapidly optimizing the processor.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not tended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

What is claimed is:

1. A controlling method for optimizing a processor, comprising:

determining an actual utilization state of the processor in a first period;

extracting an actual utilization value from the determined actual utilization state to evaluate the overall utilization of the processor after the step of determining the actual utilization state;

determining an integral parameter and a derivative parameter by a PID (Proportional Integral Derivative) governor to obtain a dynamic adjustment value based on the actual utilization state, wherein the integral parameter corresponds to a low frequency, and the derivative parameter corresponds to a high frequency;

determining a proportional parameter by the PID governor to obtain the dynamic adjustment value based on the actual utilization state; and adjusting performance and/or power of the processor in a second period by the PID governor based on the actual utilization state in the first period, wherein the second period is after the first period, the proportional parameter is determined from recent error values of the first period, the integral parameter is determined from error values in a long time of the first period, and the derivative parameter is determined from error values in a short time of the first period, and ten times of the short time is less than the long time.

2. The controlling method as claimed in claim 1, further comprising determining a target utilization value of the processor before the step of adjusting performance and/or power of the processor.

3. The controlling method as claimed in claim 2, further comprising comparing the actual utilization state with the target utilization value to obtain an error value for adjusting performance and/or power of the processor after the steps of determining the actual utilization state and the target utilization value.

4. The controlling method as claimed in claim 3, wherein the proportional parameter, the integral parameter and the derivative parameter have different weightings for obtaining the dynamic adjustment value.

5. The controlling method as claimed in claim 4, wherein the weightings of the proportional parameter, the integral parameter and the derivative parameter are determined according to the characteristics of the processor.

6. The controlling method as claimed in claim 1, wherein the step of adjusting performance and/or power of the processor comprises adjusting an operating frequency and/or an operating voltage of the processor for being operated in the second period.

7. The controlling method as claimed in claim 1, wherein when the processor is a multi-core processor, the step of adjusting performance and/or power of the processor comprises determining the number of cores to be initiated for operating the processor in the second period.

8. The controlling method as claimed in claim 1, wherein the step of adjusting performance and/or power of the processor comprises determining at least one portion of a memory for operating the processor in the second period.

9. A controlling system for optimizing a processor, comprising:

a monitor, determining an actual utilization state of the processor in a first period; and a PID (Proportional Integral Derivative) governor, extracting an actual utilization value from the determined actual utilization state to evaluate the overall utilization of the processor, determining an integral parameter and a derivative parameter to obtain a dynamic adjustment value based on the actual utilization state, determining a proportional parameter by the PID governor to obtain the dynamic adjustment value based on the actual utilization state, and adjusting performance and/or power of the processor in a second period based on the actual utilization state in the first period, wherein the second period is after the first period, the integral parameter corresponds to a low frequency, and the derivative parameter corresponds to a high frequency, the proportional parameter is determined from recent error values of the first period, the integral parameter is determined from error values in a long time of the first period, and the derivative parameter is determined from error values in a short time of the first period, and ten times of the short time is less than the long time.

10. The controlling system as claimed in claim 9, wherein the controlling system further determines a target utilization value of the processor before the PID governor adjusts performance and/or power of the processor.

11. The controlling system as claimed in claim 10, wherein the PID governor compares the actual utilization state with the target utilization value to obtain an error value for adjusting performance and/or power of the processor after the target utilization value and the actual utilization state are determined.

12. The controlling system as claimed in claim 9, wherein the integral parameter corresponds to a low frequency, and the derivative parameter corresponds to a high frequency.

13. The controlling system as claimed in claim 9, wherein the proportional parameter, the integral parameter and the derivative parameter have different weightings for obtaining the dynamic adjustment value.

14. The controlling system as claimed in claim 13, wherein the weightings of the proportional parameter, the integral parameter and the derivative parameter are determined according to the characteristics of the processor.

15. The controlling system as claimed in claim 9, wherein the PID governor adjusts performance and/or power of the processor by adjusting an operating frequency and/or an operating voltage of the processor for being operated in the second period.

16. The controlling system as claimed in claim 9, wherein when the processor is a multi-core processor, the PID governor adjusts performance and/or power of the processor by determining the number of cores to be initiated for operating the processor in the second period.

17. The controlling system as claimed in claim 9, wherein the PID governor adjusts performance and/or power of the processor by determining at least one portion of a memory for operating the processor in the second period.

* * * * *